Patented Aug. 25, 1925.

1,551,472

UNITED STATES PATENT OFFICE.

HENRY V. DUNHAM, OF MOUNT VERNON, NEW YORK.

GLUE AND PROCESS.

No Drawing.   Application filed October 5, 1923.   Serial No. 666,838.

*To all whom it may concern:*

Be it known that I, HENRY V. DUNHAM, a citizen of U. S., residing at Mount Vernon, New York, have invented new and useful Improvements in Glue and Processes, of which the following is a specification.

This process has for its object the making of an improved vegetable glue or adhesive adapted to the gluing of wood, wood veneer and the like.

A further object is to produce a cheap, strong glue of suitable viscosity which, when properly applied, does not discolor the outer surfaces of the veneers.

A further advantage of the present invention is that the glue base can be shipped and stored in a dry form ready to mix with water.

The invention is based upon the fact that if the saccharates, such as those of calcium, barium, strontium, sodium or potassium be added to starch, and the mixture then or thereafter mixed with water and heated in the usual way to produce a starch paste, the resulting product possesses strong adhesive properties and a suitable consistency so that it can be readily applied by glue-spreading machinery.

In one method of producing my adhesive, I take a suitable starch and add to it from 1 to 5% or more by weight of mono-calcium saccharate. I then add 2½ parts, more or less, of water to each one part of starch, mix thoroughly together and heat to a temperature of 140°–170° F. with continuous stirring until the mass acquires the desired character. Alternatively, an aqueous solution of calcium saccharate is added to the starch suspended in water, prior to heating, with the same result. In another method, the saccharate can first be added to the water, then the starch added, stirred and heated.

In place of mono-calcium saccharate I may use equivalent amounts of di- or tri-calcium saccharates, or the corresponding saccharates of barium or strontium. I may also use compounds of the alkaline earth hydroxids with glucose, lævulose, maltose, lactose, corn syrup, molasses and like substances, and these compounds are included in the general term sugary material as employed in the following claims.

In order to make clear the manner in which my improved product is prepared, I give below several examples by way of illustration, but it is to be understood that the invention is not limited to these specific examples, and variations may be employed without departing from the novelty of the invention.

*Example 1.*

225 pounds of cold water are placed in a suitable vessel, preferably a steam-jacketed kettle provided with an efficient stirrer. 100 pounds of starch, preferably cassava, are added, and the suspension well stirred for about five minutes, taking care to break up any lumps. I then add 2½ pounds of finely ground mono-calcium saccharate, and after stirring for about five minutes to ensure thorough distribution, gradually apply the steam heat with continuous agitation until the mass assumes a semi-transparent appearance and uniform character, and attains a temperature of about 160° F. The steam is then shut off and the paste allowed to cool, the stirring being continued for ¼–2 hours or longer until the mass acquires a suitable consistency to spread easily on the machine. If desired, the cooling can be accelerated by circulating cold water through the jacket.

*Example 2.*

212 pounds of water are placed in the kettle and heated to about 100° F. An intimate admixture of 100 pounds of cassava starch with three pounds of strontium saccharate is then stirred in. The temperature is then gradually increased and the operation continued as in Example 1.

*Example 3.*

To 225 pounds of cold water in the steam-jacketed kettle are added two pounds of dicalcium saccharate or an equivalent amount of mono-calcium saccharate, and after stirring for minute or longer, 100 pounds of cassava starch are added and the operation continued as in Example 1.

*Example 4.*

A mixture of three pounds of calcium glucosate and one-half pound of strontium glucosate is dissolved in 250 pounds of water contained in a steam-jacketed kettle or other suitable receptacle. 100 pounds of cassava starch are then stirred in, after which the temperature is gradually raised to about 165° F., and the operation continued as in Example 1.

*Example 5.*

To 230 pounds of tepid water in the jacketed kettle are added 5 pounds of sodium saccharate followed by 100 pounds of cassava starch, the whole well stirred and the operation continued as in Example 2.

In the following claims, the expressions "a saccharate", "a compound" are intended as covering one or more saccharates or compounds, and the expression "an alkali-forming metal" is intended to cover one or more of the alkali metals or alkaline earth metals or both.

I claim:

1. The process of making an adhesive from starch which comprises treating the starch with a saccharate of an alkali-forming metal, and thereafter heating with water at least to the bursting temperature of starch granules.

2. The process of making an adhesive from starch which comprises mixing the starch with a plurality of saccharates of alkali-forming metals and heating at any stage of the process sufficiently to burst starch granules.

3. The process of making an adhesive from starch which consists in mixing the starch with a chemical compound comprising the union of a sugary material and an oxid of an alkali-forming metal.

4. A product for use in adhesives which comprises a mixture containing starch with a saccharate of an alkali-forming metal.

5. A glue base consisting of a mixture of starch with a saccharate of an alkali-forming metal, which base on mixing with water and heating to above the bursting temperature of the starch granules is capable of producing an adhesive suitable for gluing up wood veneers.

In testimony whereof I affix my signature.

HENRY V. DUNHAM.